United States Patent [19]

Corrigan et al.

[11] Patent Number: 4,583,280
[45] Date of Patent: Apr. 22, 1986

[54] METHODS AND MEANS FOR SEQUENTIALLY MEASURING THE TIMES INVOLVED IN A PLURALITY OF MANUFACTURING OPERATIONS AND FOR DETECTING MECHANICAL MALFUNCTIONS IN AN AUTOMATED SYSTEM

[75] Inventors: James I. Corrigan, Laurel Springs, N.J.; Casper P. Lunova, Churchville, Pa.

[73] Assignee: The Budd Company, Troy, Mich.

[21] Appl. No.: 452,660

[22] Filed: Dec. 23, 1982

[51] Int. Cl.⁴ .................... B22P 23/06; B23Q 7/00
[52] U.S. Cl. .................................. 29/563; 364/569; 408/3; 409/80; 409/158
[58] Field of Search ............... 29/563, 568, 33 P; 409/80, 158; 408/3, 1, 4, 5, 6, 7, 13, 44, 45; 364/569, 474

[56] References Cited

U.S. PATENT DOCUMENTS

| | | | |
|---|---|---|---|
| 3,339,434 | 9/1967 | Sparling | 408/6 |
| 3,548,172 | 12/1970 | Centner et al. | 408/3 X |
| 4,142,238 | 2/1979 | Brandt et al. | 364/569 X |
| 4,309,600 | 1/1982 | Perry et al. | 29/33 P X |
| 4,365,306 | 12/1982 | House et al. | 364/569 X |

Primary Examiner—Z. R. Bilinsky

[57] ABSTRACT

A series of steps are performed at a plurality of stations on a component as it is automatically transferred from one station to the next during a manufacturing operation. Means and methods for measuring and recording the time cycles for each of the steps are provided. The recorded times cycles may then be compared with predetermined standards to determine the location of any faulty operation.

8 Claims, 5 Drawing Figures

METHODS AND MEANS FOR SEQUENTIALLY MEASURING THE TIMES INVOLVED IN A PLURALITY OF MANUFACTURING OPERATIONS AND FOR DETECTING MECHANICAL MALFUNCTIONS IN AN AUTOMATED SYSTEM

BACKGROUND OF THE INVENTION

In the manufacture of many components, such as an automobile door, for example, a number of stations are provided with each station including the tooling and equipment for performing a single operation or multi-operations on the component. Upon completion of one operation, which may involve forming or joining of parts, the component is transferred to subsequent stations until all the steps to complete the component have been completed.

When mass production techniques and automation are employed, it is highly desirable to be able to monitor and record operations being performed to determine any malfunctions in the operation of the equipment or tooling being used. The recording of data relating to the operations makes it possible to pinpoint a malfunctioning, a misadjustment of one of the control elements or faulty operation to a particular piece of equipment and to take corrective measures in a relatively short time. A recording of the data relating to the operations may indicate a stop in the system overnight, for example.

Equipment and tooling are generally designed to operate within certain time limits. If the equipment or tooling operation takes too long or too short a time to perform its functions, it generally indicates that the equipment is not operating efficiently. While the overall quality of the component may not always be effected by slower operating equipment and tools, the overall time for manufacturing of the component may be greatly increased to thereby add considerably to the overall manufacturing cost. If the time involved is too short, it may indicate that the equipment is performing its function too fast and may mar or otherwise damage the components involved.

OBJECTS OF THE INVENTION

It is an object of this invention to provide improved methods and means for measuring the cycle times for a plurality of operations in an automation system.

It is a further object of this invention to provide improved methods and means for monitoring and recording the cycle times for a plurality of operations in an automation system and comparing the times involved with predetermined standards.

It is still a further object of this invention to provide improved methods and means for readily detecting and recording a fault in one of a plurality of operations in an automation system.

It is still a further object of this invention to provide an improved system having a permanent print out relating to the time cycles and/or faults in the operation of a number of manufacturing steps.

It is still a further object of this invention to provide an improved system which permits supervisory personnel to check the functioning of a particular piece of equipment any time during the manufacturing operation.

SUMMARY OF THE INVENTION

In accordance with the present invention, a series of steps are performed at a plurality of stations to manufacture a component. Electrical means at each of the stations start and stop the series of steps. After the series of steps are performed at one station, the component is transferred to the subsequent stations until the steps in the manufacturing operation are completed. Means are provided to measure and record the time cycle of each of the steps as well as the total time of all the steps at a particular station. The time periods recorded may be compared with predetermined standards to pinpoint a malfunctioning or faulty operation in the equipment or tooling performing the steps.

Other objects and advantages of the present invention will be apparent and suggest themselves to those skilled in the art from a reading of the following specification and claims taken in conjunction with the accompanying drawings.

DETAILED DESCRIPTION OF THE PREFERRED EMBODIMENTS

The present invention is related to measuring and recording the time cycles involved for performing various steps in a manufacturing operation at each of a number of stations as well as measuring and recording the total performance times at each of the stations. In such a manufacturing operation, a number of stations are involved wherein a component to be worked upon is subjected to a series of steps at one station prior to being transferred to a subsequent station until all the steps at all of the stations have been completed. The time cycles recorded may be compared with standard design times to determine if the cycles are too long or too short and to indicate where in the system a malfunctioning or defective component may exist. The recorded data, which may be a print out is readily available to supervisory personnel to take corrective measures when necessary.

The time measurements may relate to different manufacturing operations involving assembly of parts. They may also relate to the operation of equipment involving mechanical punch presses and the like.

The present invention, while not limited thereto, will be described in connection with the assembly of a door for an automobile involving the joining of an inner panel to an outer panel. Such types of doors are well known. Generally, space is provided between the inner and outer panels to receive the window and various mechanisms relating to raising and lowering of the windows, as well as the lock mechanisms for the door.

Figure 1:
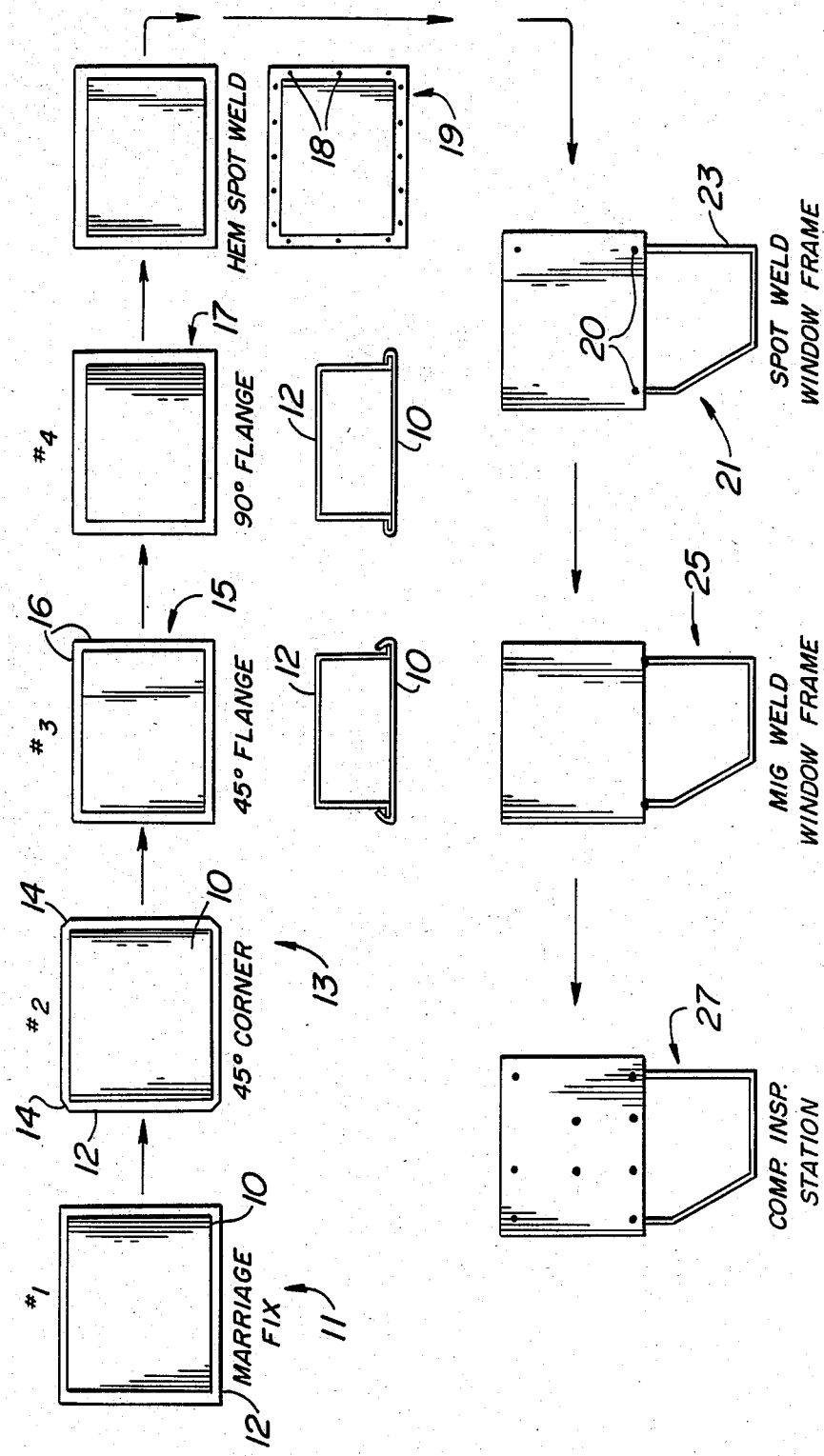
FIG. 1 illustrates a number of stations involved in a manufacturing operation for joining inner and outer door panels for use in an automobile.

Referring to FIG. 1, an inner panel 10 is aligned with an outer panel 12 which may already have a 90° bend therein. The alignment of the two panels may be done automatically at a first operating station 11. After the panels 10 and 12 are aligned at a first station 11, they are passed onto a second station 13 where the initial steps are taken to join the two panels. The various steps to be taken in connection with the second station 13 are illustrated and will be described in detail in connection with FIG. 2.

Basically, the steps in the operations at station 13 involve forming 45° corners at the four corners of the outer panel 12. These 45° corners are illustrated, for example, by bends 14. These initial 45° bends are necessary to prepare the panels for the subsequent steps.

After the 45° bends are made in the outer panel 12, the assembly involving the inner and outer panels are passed onto the third station 15 where a subsequent operation takes place. The shapes of the outer edges of the two panels are illustrated in station 15. It may be seen that the inner panel includes 90° bends along the edges and shaped to provide spacing between the inner and outer panels. Further, it may be seen that the edges of the outer panel 12 extend beyond the edges of the inner panel 10 to provide the metal to wrap around the edges of the inner panel during the various bending steps.

At station 15, four edges 16 of the outer panel 12 are bent 45° in the manner illustrated. The figure below the main figure in the stations 15 and 17 illustrate generally the top views showing the bends made in the edges 16. Following the formation of the 45° bends in the edges 16, the assembly including the inner and outer panels are passed onto a subsequent station 17.

At the station 17, the edges 16 of the outer panel 12 are subjected to various pressure devices to further bend the edges an additional 45° to a total of 90° in the manner illustrated so as to firmly secure the outer and inner panels together. The various electrical operations, with respect to measuring the time cycles involved, relating to stations 15 and 17 are basically similar to those taking place at station 13 which will be described in detail in connection with FIG. 2.

Additional other stations involved in forming a door are illustrated. After all the steps at station 17 have been completed, the joined panels are transferred to station 19. At the station 19, a number of hem spotwelds 18 are made in the door.

At the next station 21, a window frame 23 is spotwelded to the inner and outer panels at welds 20.

Following the spotwelding to provide the holding of the window to the door, the window frame 23 is MIG welded to the inner and outer panels at station 25 to firmly secure the window frame to the panels. Finally, at station 27, the window and door are passed to a completion inspection station where the results of all of the various operations are manually observed.

As previously mentioned, the present invention involves measuring and recording the times involved for the different manufacturing steps at each of the stations as well as measuring and recording the total time of all of the steps at a particular station as well as checking for mechanical malfunctions. By recording the cycle times of the steps involved at the various stations as well as the total times, print outs may be provided relating to all the different operations involved in the manufacturing process. With this print out, it is possible for a supervisor to pick out a faulty operation relating to a particular step at a particular station and take corrective measures. Generally, if the times involved in performing the different steps are excessive or too short, malfunctioning or a defective unit in the system is indicated.

The automatic mechanical actions on the panels involved are related to all of the stations involved. The stations 19, 21, 23 and 25 involve welding or visual inspections.

Because all of stations 11, 13, 15, 17, 19, 21, 23, and 25 involve positioning or performing mechanical actions and action on the panels illustrated, they in general all use similar types of components such as relays, contacts, limit switches and the like. Generally, different sets of electrical elements become operative at different times when the panels are at predetermined locations to cause mechanical equipment to perform a step on the panels or move it to different positions. Basically, electrical means are provided at the stations to mark the start and stop times of the steps involved.

Because the invention is not directed particularly to the electrical components or operations thereof, only the details of one of the stations 13 will be illustrated or described in detail. Use of similar types of components may also be used at the other stations. The components or the detailed steps involved in the other stations will not be illustrated or described any further in detail.

Figure 2:
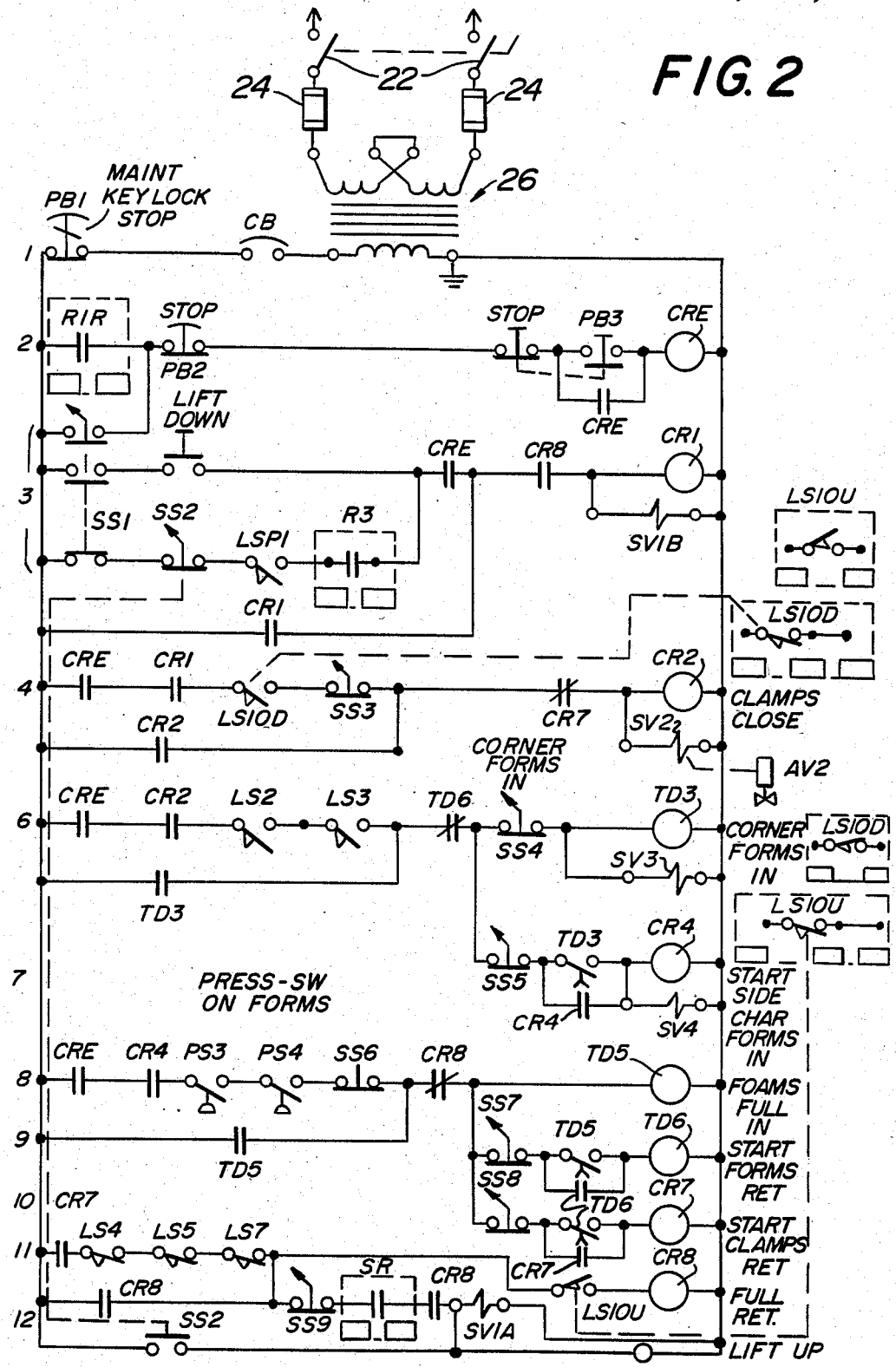
FIG. 2 is an electrical diagram illustrating electrical means for starting and stopping a series of steps in one of the stations illustrated in FIG. 1.

Before describing FIG. 2 involving station 13, it is well to understand generally the type of operation involved. The inner and outer panels are transported by a conveyor from the so-called marriage or first station 11 into the station 13 where 45° corners are to be formed on the outer panel 12. At the station 13, a number of steps are required to form the 45° corners. The machinery and equipment for performing these steps are not directly related to the invention and therefore not illustrated. Generally, a conveyor system is employed to move the panels from the station to station. This also is monitored by the system.

Many electrical components in the system, such as limit switches, time delay circuits, control relays with contacts and the like, are generally built into the conveyor means and at the stations involved. The electrical circuits employed in connection with the conveyor means and at the stations may take a wide variety of different forms. Keeping in mind that the present invention is primarily concerned with timing the cycles of steps at particular stations as well as with the total time cycle involved at a particular station, the various steps taken at station 13 will be generally described, it being understood that somewhat similar equipment and operations also take place at the other stations.

The means for measuring the time cycles of the steps involved in a particular station as well as the total time involved will be described in connection with FIGS. 4 and 5.

After the panels 10 and 12 have been transported by a conveyor from station 11 to station 13, they are lowered by a lowering mechanism out of the main line of the conveyor belt in preparation for the subsequent machanical steps to be performed. Means including timing circuits are employed to indicate the start of the so-called "lift-down" cycle of the lowering mechanism. This start time also coincides with the total start cycle time to be measured and recorded relating to station 13.

When the lift-down mechanism is fully down, the lift-down timer is stopped with the time from the start to the end of the lift-down cycle being measured and recorded. At the lowered position, clamping means are actuated to hold the panels together. Clamps are closed and positioning elements are moved into position. When the clamps start to move into position, the time is started and continues until the clamps and form positioners are fully in place on the panels. The total time that it takes for the clamps to close is measured by timing circuits to be described. The form position timers now start to measure the total movements of corner and side forms.

A subsequent operation stops the side form timer and starts the form full in timer. This means that the forms are fully in place in the system. These steps will be illustrated in FIG. 2.

A subsequent operation stops the corner form timer and form full in timer. This means that the formers for the 45° angles have performed this particular function and the time cycle for accomplishing this is measured and recorded. Another timer is now started to measure the time that it takes to retract the forms.

The forms are withdrawn and when they are fully withdrawn, the timer for the retract form is stopped. After the form has fully retracted, the timer for starting the retraction of the clamps starts.

The next step involves measuring the time that the clamps are fully retracted. Thus the time for starting and stopping the retraction of the clamps is measured and recorded. The forms are retracted with the time measured for retracting the forms with that time being also recorded. Following all these operations, it is now necessary to lift up the panels so they may be transferred by the conveyor means to the next station. A so-called "lift-up" timer starts when the lift-up operation commences.

When the lift-up operations is finished, the stop lift timer is stopped with the total amount of time for lifting being measured and recorded. At this time, the complete operation at the particular station 13 involving the 45° corner bends has been completed. The total time required for all of the foregoing steps is then measured and recorded.

Referring to FIG. 2, a main power source is connected through switches 22 and fuses 24 to a power transformer 26. FIG. 2 is a parallel electrical diagram. Among the reasons for illustrating the invention in this manner is that operations involving particular components may be incorporated in a number of different lines. For example, a relay may include a main coil in one line for operating a plurality of different pairs of contacts in other lines. Common letter designations, rather than individual reference numerals are used for clarity in order to show the relationship between the components. Different lines towards the left are designated to indicate generally the locations of the circuitry involved for different mechanical steps.

Before power can be applied to line 1 including the secondary winding of the transformer 26, the pushbutton PB1 and the circuit breaker CB must be closed. Lines 2 and 3 are primarily directed to the manual operation of the system. This manual operation may be done in order to inspect various operations of the system when it is not in the automatic mode. The manual operation, however, is not particularly related to the present invention, but is illustrated because it is generally incorporated into any system, such as the one involved in manufacturing automobile doors.

When the system is to be operated in the manual mode, relay R1R is closed, pushbutton PB2 is closed, and PB3 is closed to operate control relay CRE which in turn closes the contacts CRE in other lines. Various indicator lights may be employed in the system to indicator the operating states of the various circuits.

The system involved will be described in connection with the automatic mode because this is where the measurement and recording of the time cycles are involved.

Referring to line 3 of FIG. 2, various elements must be actuated to start the start of the time cycle of the first step as well as start the measurement of the total time cycle. Selector switch SS1 is closed, SS2 is closed, limit switch LSP1 is closed, indicating that the fixture carrying the inner and outer panels in place. A contact R3 is closed along with the contacts CRE. Control relay contacts CR8 are closed thereby completing the circuits to control relay CR1 and solenoid valve SV1B which starts the cycle of operation. When CR1 is operated, the total time of a fixture at a particular station is started. The various logic controls for measuring this time is illustrated in connection with FIG. 4. At the same time that the total time is started to be measured, the time of the "lift-down" starts. This lowers the panels in preparation for subsequent steps. The circuitry for measuring this time cycle is illustrated in FIG. 5, which will be subsequently described.

Basically, therefore, it may be said that line 3 initiates or starts two timing cycles, one related to the total time involved that the fixture or panels are being worked on at the station 13 and a second time cycle which measure the particular time involved in one of a number of steps at the station 13.

As previously mentioned, the inner and outer panels are generally transported by a conveyor and then taken out of the normal path and lowered into another position to permit various mechanical elements to perform certain functions relating to the panels.

Causing the panels to be lowered is referred to as "lift-down" time. The amount of lift-down time is the time it takes to lower the panels from its original position on the conveyor to the lowered position. Operation of the relay CR1 and solenoid valve SV1B start the counters which will measure the lift-down cycle time. Operation of SV1B starts the lift-down mechanism.

Line 4 will generate a signal when the lift is completely down to end the lift down cycle and start the clamps closing cycle. As indicated in line 4, control relay CRE is closed, control relay CR1 is closed, limit switch LS10D, indicating that the fixture with the panels is completely down is closed, switch SS3 is closed and control relay CR7 is closed, thereby completing the circuit to control relay CR2 which also completes the circuit to solenoid valve SV2. When the CR2 is operated indicating that the lift is down, the lift down counter stops and the timing of the closing of the clamps start. SV2 causes an air valve AV2 to come into operation.

When the fixture and panels are completely down, the next step involved is the moving of the clamps to clamp the panels together.

The next time to be measured are the times that the movement of clamping stops and the times that the corner and side forms start.

Referring to line 6, control relay CRE is closed, control relay CR2 is closed, limit switches LS2 and LS3 are closed, indicating that the clamp and form positioners are closed, TD6 is closed, selector switch SS4 is closed to actuate the time delay TD3, SV3. The actuation of TD3 stops the clamp time cycle which is measured by a circuit, such as the circuit of FIG. 5, and starts the timer for the corner forms and side forms.

At the same time that SS4 is closed, selector switch SS5 is closed, TD3 is closed to operate the control relay CR4 and solenoid SV4. Operation of the CR4 closes contact CR4. Operation of CR4 starts the side form time and starts the forms full in timer.

Line 8 permits current to pass through CRE, CR4, pressure switch PS3, pressure switch PS4, selector switch SS6, time delay CR8 which closes the circuit to TR5 indicating that the forms are fully in. Operation of TD5 stops the corner form times and form full in timers at the same time they start to retract the form timers.

As indicated in lines 9 and 10, TD5 is operated at the same time that the switch SS7 closes. The TD5 contacts are closed when TD5 relay is actuated to actuate TD6. Actuation of TD6 stops the retract form timer and starts the retract clamps timer.

At the same time that TD6 is in, and SS8 is closed, control relay CR7 becomes operative to stop the retract clamp timer. This is indicated on line 10.

The next operation involves line 11 which becomes operative after CR1 drops out. CR7 is closed, LS4 and LS5 are closed, LS7 is closed, and LS10U is closed to operate CR8.

Operation of CR8 indicates that full retraction of the clamps have taken place. This stops the clamp turn timer and forms full and retract timer and starts the lift up timer.

As indicated on line 12, current is applied through CR8, SS9, SR, CR8, SV1A to stop the lift up timer and also stop the total timer.

The various details of FIG. 2 are shown mainly for purposes of illustration as to how a number of electrical components may be involved in performing a single step. Also, each station may involve a relatively large number of steps. By having a print out relating to the time taken to perform each step, it is possible to readily find the location of a malfunctioning or defective parts to permit corrective action to be taken.

Figure 3:
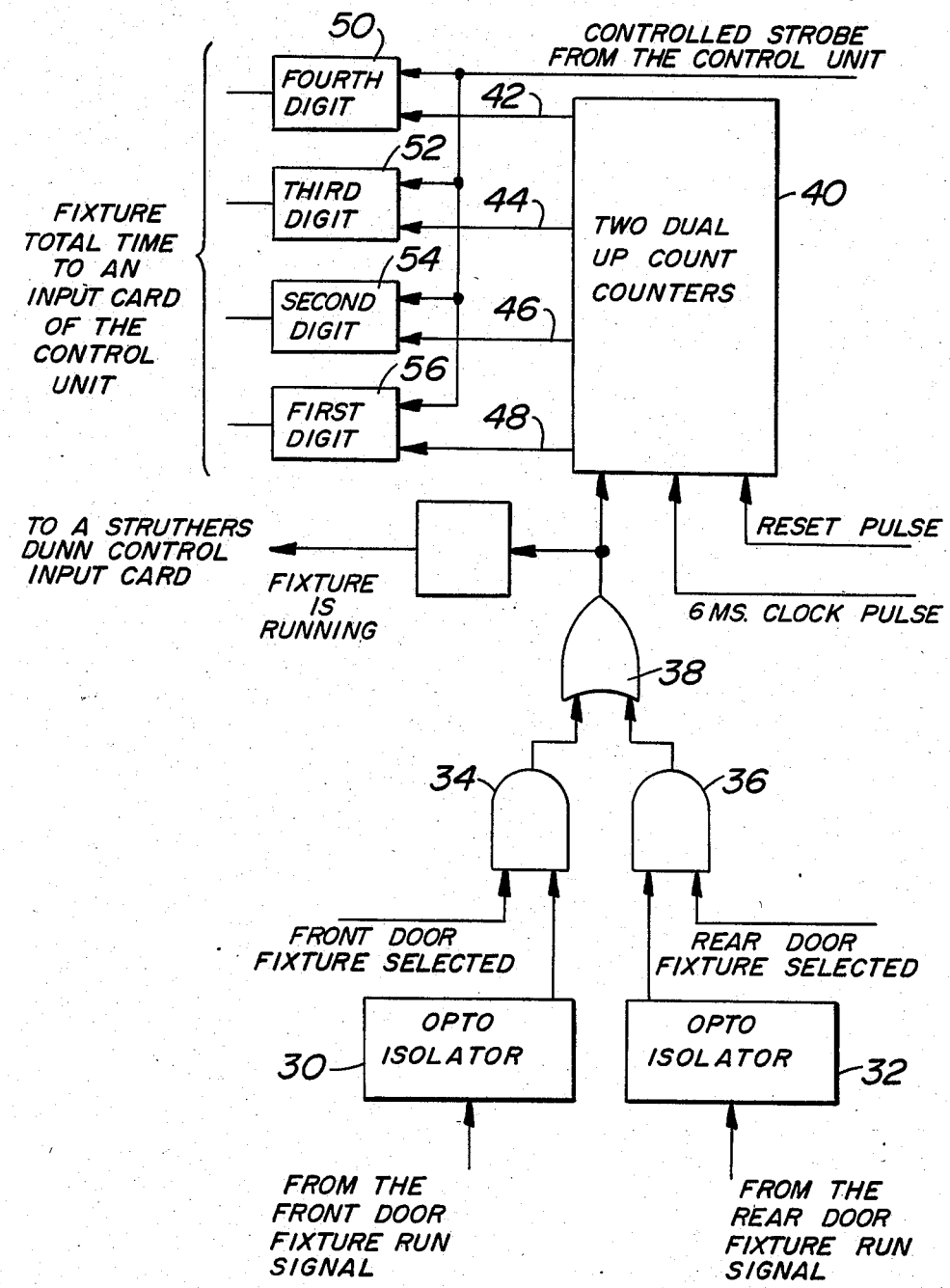
FIG. 3 is a logic block diagram illustrating means for measuring the total time cycle for all the steps in the operations at a single station.

Referring to FIG. 3, a logic circuit is illustrated for measuring the total time involved for a pair of panels at a particular station, such as the station 13. In the example illustrated, provision is made for different sized doors, for example, a front door or a rear door. In the present example described in connection with FIG. 2, it was assumed that a front door was involved.

When the operation starts at a particular station such as station 13, a signal is sent by any suitable well known means not illustrated to one of the OPTO isolators 30 or 32 which develops a signal which is directed to one of the AND gates 34 or 36, depending upon which door is being run. In the present example, where a front door is involved, the AND gate 34 develops an output signal which is applied to an OR gate 38.

As long as a signal is being developed by the AND gate 34, the OR gate 38 develops an "enable" signal, which is applied to a counter 40. Prior to the application of the enable signal, the counter 40 is in a reset position as a result of the application of a reset pulse. Clock pulses are also applied to the counter 40. As long as the enable signal is being applied from the OR gate 38, the pulse signals cause the counter 40 to develop output pulse or timing signals at leads 42, 44, 46 and 48. These output signals develop four digits at digital storage circuits, which are indicated at blocks 50, 52, 54 and 56.

The status of the four blocks 50, 52, 54 and 56 determine the total time that a station is performing steps on the door panels.

The signals or clock pulses from the counter 40 are terminated when the AND gate 34 does not develop an output signal. The total fixture time represented by the operating states of the digital storage circuits 50, 52, 54 and 56 may be applied to an input card when the strobe signal is present. The time is now compared to the design time.

Figure 4:
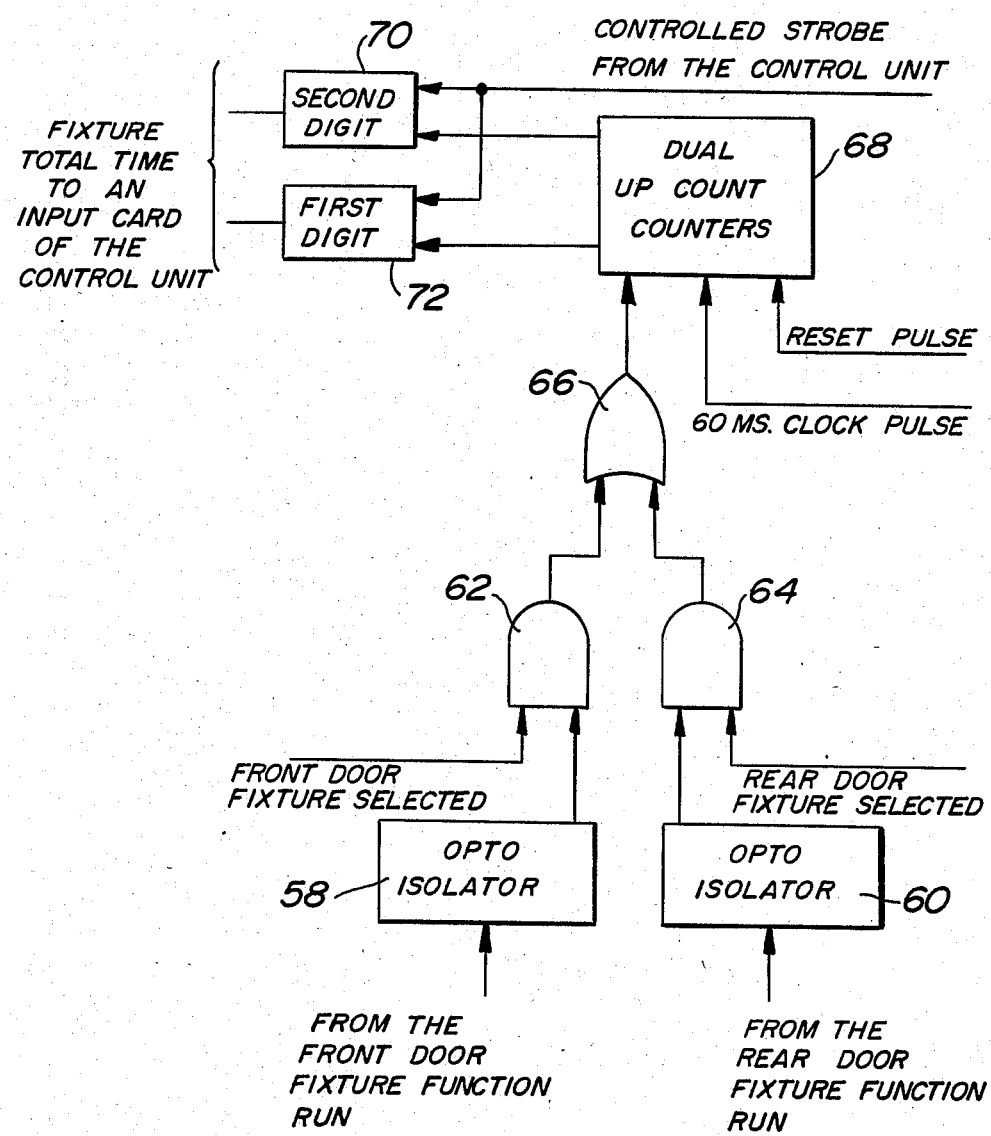
FIG. 4 is a block diagram, somewhat similar to FIG. 3, illustrating means for measuring the time cycle for a single step at one of the stations.

The various counting techniques illustrated in FIG. 4 are well known to those skilled in the art and therefore will not be further described in detail.

Referring to FIG. 4, a circuit very similar to the circuit illustrated in FIG. 3 is illustrated. This circuit is utilized to measure the time involved for a particular step of a number of steps at a particular station. Because the time involved is relatively short as compared with the total time, only two digital storage circuits may be required. Actually, the number of digits used may vary and the number of digits described are merely examples.

A signal is applied from the circuit involved with a particular step at one of the stations and applied to one of the OPTO isolators 58 and 60, which in turn is applied to one of the AND gates 62 and 64. Because the front door is involved, the AND gate 62 develops an output signal which is applied to an OR gate 66, which in turn produces an enable signal to enable the counter 68 to start counting pulses as long as a signal is being developed by the OR gate 66.

Output pulse signals from the counter 68 are applied to develop output signals at digital storage circuits 70 and 72. The two digits developed by the circuits 70 and 72 are indicative of the time cycle involved in a particular step. The output signals from the storage circuits 70 and 72 may be applied to an input card or print of the control unit by any well known means. The data may be used to print out the results of the times involved which may be compared with predetermined design time requirements.

Figure 5:
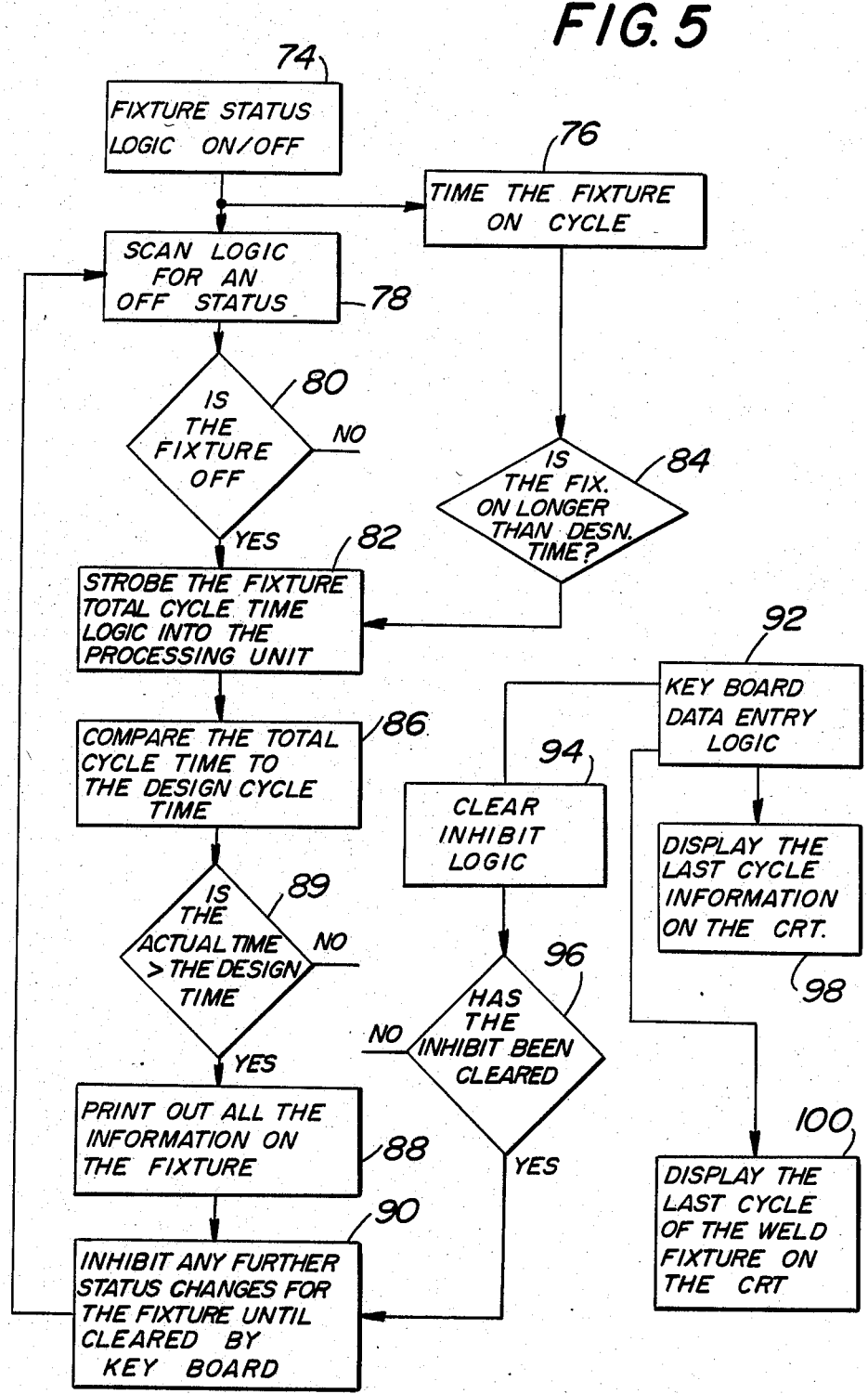
FIG. 5 is a diagram illustrating broadly the steps of a program for monitoring and recording the total time cycles involved in the operations of a single station; and, FIG. 6 is a diagram illustrating a display or printout resulting from a failure in one of the stations.

Referring to FIG. 5, the generalized block diagram illustrating the program involved in the present system is illustrated. A block 74 includes logic for indicating whether the fixture is on or off. When the fixture is on, an output signal is developed and applied to a timer to time the fixture on cycle, the timer being indicated by a block 76. Output signals from the logic circuit 74 is applied to a scan logic circuit 78 which in turn is applied to a block 80. If the fixture is on, the operation is discontinued. If a yes signal is indicated, the operation continues and is applied to a logic circuit 82.

The time developed at the logic timer 76 is applied to a circuit 84, which may include a comparator or other means, to determine whether the total time involved with the fixture is longer than a predetermined set percentage. If it is longer than the predetermined percentage, this may indicate that there is a faulty functioning of one of the parts, a defective part, or improper setting of the part. In most cases, the operation or system will be discontinued.

If the time involved in the total cycle is shorter or within the designed time required, no output signal will be developed by the circuit 84. However, circuitry not illustrated may be employed to detect time cycles less than a predetermined percentage to stop the system in much the same manner as too long a time cycle is detected.

If the time is longer than the designed period in excess of a predetermined percentage, a signal will be developed and applied to the strobe logic 82. The output from the strobe logic 82 is applied to a comparator 86 which compares the total time to the design time. Depending upon the output signal from the comparator 86, if the total time is greater than the design time, the output signal is developed which is applied to a device 88 which is utilized to print out all the information relating to the fixture.

If the signal developed by the block 89 indicates that the actual time is not greater than the design time, the operation continues as normal, unless, as mentioned, means are also provided to discontinue the operation for excessively short time cycles.

When a signal is developed by the circuitry 84, a signal is developed and applied to an inhibit circuit 90, which inhibits any further status changes for the fixture unril it is cleared by an entry into a keyboard 92.

signal at circuit 94 to clear the inhibit signal. The logic circuit 96 determines whether the inhibit has been cleared and, if it is, a signal is applied from the circuit 96 to the circuit 90 to permit normal operation of the system. If the inhibit has not been corrected or cleared, no signal is applied to the circuit 90 and the system will not operate.

As in most conventional keyboards, means may be provided to display the last cycle of information on the cathode ray tube which may be included in a circuit 98. The last cycle of the weld fixture on the fixture may also be displayed on a cathode ray tube by means of circuitry in circuit 100.

An example of a typical print-out resulting from a failure of station 13 is as follows: The station 13 is controlled by electro-mechanical control relays and the apparatus and methods related to the invention involves retro-fitting various circuits to work with the control unit.

R/H F/D 45 CORNER 723-610-641 WEB-5210-A
TOT. DESIGN TIME 2360
TOT. ACTUAL TIME 2760

| LN. | SEQUENCE OF OPP. | FUNCTIONS | DESN. | ACT. |
|---|---|---|---|---|
| 01 | LOCK-IN & STOP | CB PB1 RIR SS1 PB2 PB3 CRE CRE | — | — |
| 02 | CYCLE START | SS1 SS2 LSP1 R3 PB4 CRE CR8 CR1 | — | — |
| 03 | LIFT DOWN | SS1 SS2 LSP1 R3 CR1 CRE CR8 SV1B | 0760 | 0750 |
| 04 | CLAMPS CLOSE & FORM POS. FORWARD | CRE CR1 LS10D SS3 CR7 CR2 SV2 AV2 | 0210 | 0210 |
| 06 | CORNER FORMS IN | CRE CR2 LS2 LS3 TD6 SS4 TD3 SV3 | 0260 | 0250 |
| 07 | START SIDE FORMS IN | TD3 TD6 SS5 TD3 CR4 CR4 SV4 | 0090 | 0090 |
| 08 | FORMS FULL IN | CRE CR4 PS3 PS4 SS6 CR8 TD5 | 0310 | 0300 |
| 09 | START FORMS RET. | TD5 CR8 SS7 TD5 TD6 TD6 | 0280 | 0280 |
| 10 | START CLAMPS RET. | TD5 CR8 SS8 TD6 CR7 CR7 | 0220 | 0220 |
| 11 | FORMS FULL RET. | CR7 LS4 LS5 LS10U CR8 | 0340 | 0330 |
| 11 | CLAMPS FULL RET. | CR7 LS7 LS10U CR8 | 0110 | FFFF |
| 12 | LIFT UP | CR8 SS9 SR CR8 SS2 SV1A | 0820 | FFFF |

It is noted that the logic in the block 78 scan includes scan logic for an off status which is the result of a signal from the circuitry involved in block 90.

When the total time is greater than the design time, steps must be taken to correct the malfunctioning, misadjustment or defect in a part. When it is corrected, an entry must be made in the keyboard 92 to produce a An example of a typical print-out resulting from a failure of station 27 is as follows, station 27 is controlled by a programmable controller. This means we can take the print-out one or more steps beyond station 13 and print the page of the electrical diagram of the circuit in which the failure occurred.

ELECTRONIC INSPECTION SIXTURES 723-610-702
TOTAL DESIGN TIME 2450
TOTAL ACTUAL TIME 3025

| PG. | SEQUENCE OF OPERATION | FUNCTIONS | DESN. | ACT. |
|---|---|---|---|---|
| 01 | AUTOMATIC | 001 000 003 004 161 301 | — | — |
| 01 | MANUAL | 005 162 302 | — | — |
| 02 | FRONT or REAR SELECT | 006 163 303 or 007 164 304 | FRONT | SEL. |
| 03 | LINE STOP & LOCK-IN | 008 009 SG 011 012 305 | — | — |
| 03 | HYDROLIC PUMP ON | 014 -M- 036 | PUMP | ON |
| 04 | MASTER GAGES FULL RET. | 035 036 LS39 LS40 352 | GAGES | RET. |
| 05 | TRANSFER FULL FWD. | 035 LSF 167 308 | 0310 | 0300 |
| 05 | TRANSFER FULL RET. | 305 LSR 168 309 | 0560 | 0550 |
| 08 | IDLE LIFT FULL DOWN | 305 LSLD 315 174 | 0160 | 0160 |
| 11 | CYC. START & IDLE LIFT UP | 305 T20 317 309 322 319 317 SV1B | 0380 | 0370 |
| 39 | SPANKERS IN & OUT | 303 304 T20 317 LSD7 SV16 or LSP8 SV17 | 0920 | 0910 |
| 06 | INSP. LIFT FULL DOWN | 323 LSFD LSP1 SV3B or LSPD LSP2 SV11B | 0440 | 0430 |
| 16 | PART DOWN IN GAGE AREA | 323 LSP3 LSP4 LSP5 LSP6 CRA CRH 324 325 | — | — |
| 17 | PUSHERS #1 IN | 324:25 311:13 048 CRA 339 208 SV4 SV12 | 0230 | 0230 |
| 19 | PUSHERS #2 IN | 324 325 T02 049 311 T3 208 SV5 SV13 | 0210 | 0210 |
| 20 | CLAMPS IN | T03 050 311 312 329 352 T04 SV6 SV14 | 0200 | 0210 |
| 21 | SENORS POSIT. IN | 324 325 199 202 51 T4 336 T5 SV7B SV15B | 0320 | FFFF |
| 22 | PART PUSHERS 1 & 2 RET. | T05 208 054 208 | 0560 | FFFF |
| 24 | SENSORS FULL IN | T07 326 T08 SR 212 | 0210 | FFFF |
| 27 | SENSORS 1, 2 & 3 CLEAR | T11 303 304 LS1, 2 & 3–LS21, 22 & 23 332 | — | — |
| 31 | SENSORS FULL RETRACT | 332 333 334 335 336 303 SV7A | 0360 | FFFF |
| 31 | SENSOR POSITIONERS RET. | 332 333 334 335 303 304 336 SV7A SV15A | 0190 | FFFF |
| 32 | CLAMPS RETRACT | LS13 303 or LS33 304 337 | 0110 | FFFF |
| 32 | PUSHER #1 RETRACT | LS15 303 or LS35 304 337 | 0130 | FFFF |

| | -continued | | | |
|---|---|---|---|---|
| ELECTRONIC INSPECTION SIXTURES 723-610-702 | | | | |
| TOTAL DESIGN TIME 2450 | | | | |
| TOTAL ACTUAL TIME 3025 | | | | |
| PG. | SEQUENCE OF OPERATION | FUNCTIONS | DESN. | ACT. |
| 32 | PUSHER #2 RETRACT | LS16 303 or LS36 304 337 | 0120 | FFFF |
| 06 | INSPECTION LIFT F/UP | 338 LSFU LS37 SV3A or LSRU LS38 SV11A | 0450 | FFFF |
| 09 | TURNOVER CLEAR & READY | 305 LSPA LSP1 LS2R CR4 316 | NOT READY | |

Referring to FIG. 6, there is shown a printout obtained when a failure has taken place in line 21 as indicated by the letters "FFFF". Consequently, none of the subsequent steps takes place. In this case, as well as in case of failures in any of the stations, the circuitry involved in the failure is automatically printed in the manner as shown in FIG. 6. The steps involved in the printout are programmed in the micro-processor involved.

It is noted from the print-out that the various time cycles are recorded and compared with design times. By reading the print outs, supervisory personnel may readily pinpoint the areas of trouble in a station and take corrective measures.

What is claimed is:

1. In combination with a conveyor for transporting mechanical components through a plurality of stations for performing a series of steps at each station in the manufacturing of said component,
   means for monitoring and recording data relating to said series of steps at each of said stations comprising:
   (a) electrical means at a first station for starting and stopping each of said series of steps and causing the operation of the next of said series of steps until all the steps at said first station have been completed;
   (b) second electrical means for sensing the last of the series steps of said first station and causing said component to be sequentially transferred by said conveyor to a next station;
   (c) means for measuring and recording the cycle times of each of said series of steps at said plurality of stations,
   (d) second means for measuring and recording the total time of the series of steps at each of said plurality of stations, and
   (e) said series of steps including a plurality of actuating mechanical elements responsive to said electrical means to sequentially perform said series of steps.

2. A combination as set forth in claim 1 wherein the start and completion of each of said series of steps cause electrical signals to be generated to start and stop a first timing circuit to measure the time cycle of each of said series of steps.

3. A combination as set forth in claim 2 wherein the start and completion of all of said series of steps at each of said plurality of stations cause second electrical signals to be generated to start and stop a second timing circuit to measure the total time cycle of a series of steps at each of said plurality of stations.

4. A combination as set forth in claim 3 wherein means are provided to compare the time cycle of each of said series of steps with a predetermined time cycle.

5. A combination as set forth in claim 4 wherein second means are provided to compare the total time cycle of a series of steps at each of said stations with a predetermined total time cycle.

6. A combination as set forth in claim 5 wherein means are provided to discontinue said manufacturing of said component when said total time cycle exceeds a predetermined percentage of said predetermined total time cycle.

7. The combination as set forth in claim 6 wherein means are for recording data relating to said time cycle, said total time cycle, said predetermined time cycle and said predetermined total time cycle.

8. A combination as set forth in claim 1 wherein means are provided for indicating a malfunction in any of said series of steps.

* * * * *